(12) United States Patent
Nunez et al.

(10) Patent No.: US 6,249,845 B1
(45) Date of Patent: Jun. 19, 2001

(54) METHOD FOR SUPPORTING CACHE CONTROL INSTRUCTIONS WITHIN A COHERENCY GRANULE

(75) Inventors: Jose Melanio Nunez; Thomas Albert Petersen, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/136,329

(22) Filed: Aug. 19, 1998

(51) Int. Cl.[7] .................................................. G06F 12/00
(52) U.S. Cl. .......................... 711/129; 711/141; 711/144; 711/145
(58) Field of Search ..................... 711/129, 141, 711/144, 145

(56) References Cited

U.S. PATENT DOCUMENTS

| | | | |
|---|---|---|---|
| 5,253,358 | 10/1993 | Thoma, III et al. | 395/500 |
| 5,303,362 | 4/1994 | Butts, Jr. et al. | 395/425 |
| 5,414,857 | 5/1995 | Jeddeloh et al. | 395/725 |
| 5,440,752 | 8/1995 | Lentz et al. | 395/800 |
| 5,450,559 | 9/1995 | Begun et al. | 395/403 |
| 5,574,922 | 11/1996 | James | 395/561 |
| 5,594,877 | 1/1997 | Lentz et al. | 395/306 |
| 5,603,005 | 2/1997 | Bauman et al. | 395/451 |
| 5,604,865 | 2/1997 | Lentz et al. | 395/200.08 |
| 5,611,071 | * 3/1997 | Martinez, Jr. | 711/133 |

FOREIGN PATENT DOCUMENTS 0 706 134 A2  4/1996  (EP) ............................. G06F/12/08

\* cited by examiner

*Primary Examiner*—Do Hyun Yoo
*Assistant Examiner*—Kimberly McLean
(74) *Attorney, Agent, or Firm*—Anthony V. S. England; Bracewell & Patterson, L.L.P.

(57) ABSTRACT

A method for improving data processing in an L2 cache for symmetrical multiprocessing systems consists of efficient execution of cache control instructions without having to give up the data bandwidth provided by a greater byte coherency granule. The L2 cache has a coherency granule size within its data array and is divided into a target sector and an alternate sector. Additionally, the coherency granule has a plurality of MESI bits, which define sector write enables, and data write enables. By determining the states of the target sector and/or the alternate sector a series of L2 cache control instructions are performed to signal the L2 cache to hit. If a hit occurs corresponding data will be either written into or read out of the data array.

19 Claims, 2 Drawing Sheets

METHOD FOR SUPPORTING CACHE CONTROL INSTRUCTIONS WITHIN A COHERENCY GRANULE

BACKGROUND OF THE INVENTION

1. Technical Field

The present invention is directed to an improved data processing system and in particular for improving data cache control instructions for utilization in a data processing system. Still more particularly the present invention relates to an improved method for efficient execution of cache control instructions which operates on less bytes than the coherency granule in a Symmetrical Multiprocessing (SMP) System.

2. Description of the Related Art

Many systems for processing information include both a system memory and a cache memory. A cache memory is a relatively small, high-speed memory that stores a copy of information from one or more portions of the system memory. Frequently, the cache memory is physically distinct from the system memory. Such a cache memory can be integral with the processor device of the system (referred to as an L1 cache) or non-integral with the processor (referred to as an L2 cache).

Information may be copied from a portion of the system memory into the cache memory. The information in the cache memory may then be modified. Further, modified information from the cache memory can then be copied back to a portion of the system memory. Accordingly, it is important to map information in the cache memory relative to its location within system memory. Assuming selection of an appropriately sized cache memory and the efficient storage of data therein the limiting factor in cache performance is the speed of the cache memory and the ability of the system to rapidly read data from the cache memory.

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". If the line into which data is to be written does not exist in the cache memory, the line is either fetched into the cache memory from system memory to allow the data to be written into the cache, or the data is written directly into the system memory. This event is referred to as a cache write, "miss."

In today's fast growing microprocessor environment, backward compatibility and the ability to run existing operating systems has become a requirement. Cache control operations, most of which are privileged instructions fall under the category of requirements that must be aligned with the existing operating systems when reading or writing into cache. There are many implications to a cache organization and control with differing cache control instruction target blocks and coherency granule size that have to be taken into consideration. This is especially true of cache control operations that are visible to the software.

In prior 32-bit PowerPC microprocessors, the processors supported 32-byte cache control instructions with a 32-byte coherency granule. However, in today's modern higher performance 32-bit microprocessor design the bus supports more than 32 byte transfers, and reads more than 32 bytes from memory. In modern processors the cache block size is at least 64 bytes, but must have the ability to write and manipulate 32 byte portions within a block. Therefore there is a need for a cache structure/control that provides an efficient method for handling the cases that arise when supporting cache control operations which affect less bytes than the coherency granule and is flexible enough to accommodate all other normal operations that are commonly performed to a cache in a processor with SMP support.

In view of the above, it should be apparent that a method and system for addressing any combination of greater coherency granules than the target of cache control instructions used by a given operating system would be highly desirable.

SUMMARY OF THE INVENTION

It is therefore one object of the present invention to provide improved data cache control instructions for utilization in a data processing system.

It is another object of the present invention to provide a method and system to improve efficient execution of cache control instructions without having to give up the data bandwidth provided by a greater byte coherency granule in a Symmetrical Multiprocessing System.

It is yet another object of the present invention to provide an improved method and system for addressing any combination of greater coherency granules than the target of cache control instructions used by a given operating system.

The foregoing objects are achieved as is now described. A method for improving data processing in an L2 cache for symmetrical multiprocessing systems consists of efficient execution of cache control instructions without having to give up the data bandwidth provided by a larger byte coherency granule. The L2 cache has a coherency granule size within its data array and is divided into a target sector and an alternate sector. Additionally the coherency granule has a plurality of MESI bits, which define sector write enables, and data write enables. By determining the states of the target sector and/or the alternate sector a series of L2 cache control instructions are performed to signal the L2 cache to hit. If a hit occurs corresponding data will be either written into or read out of a data array.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
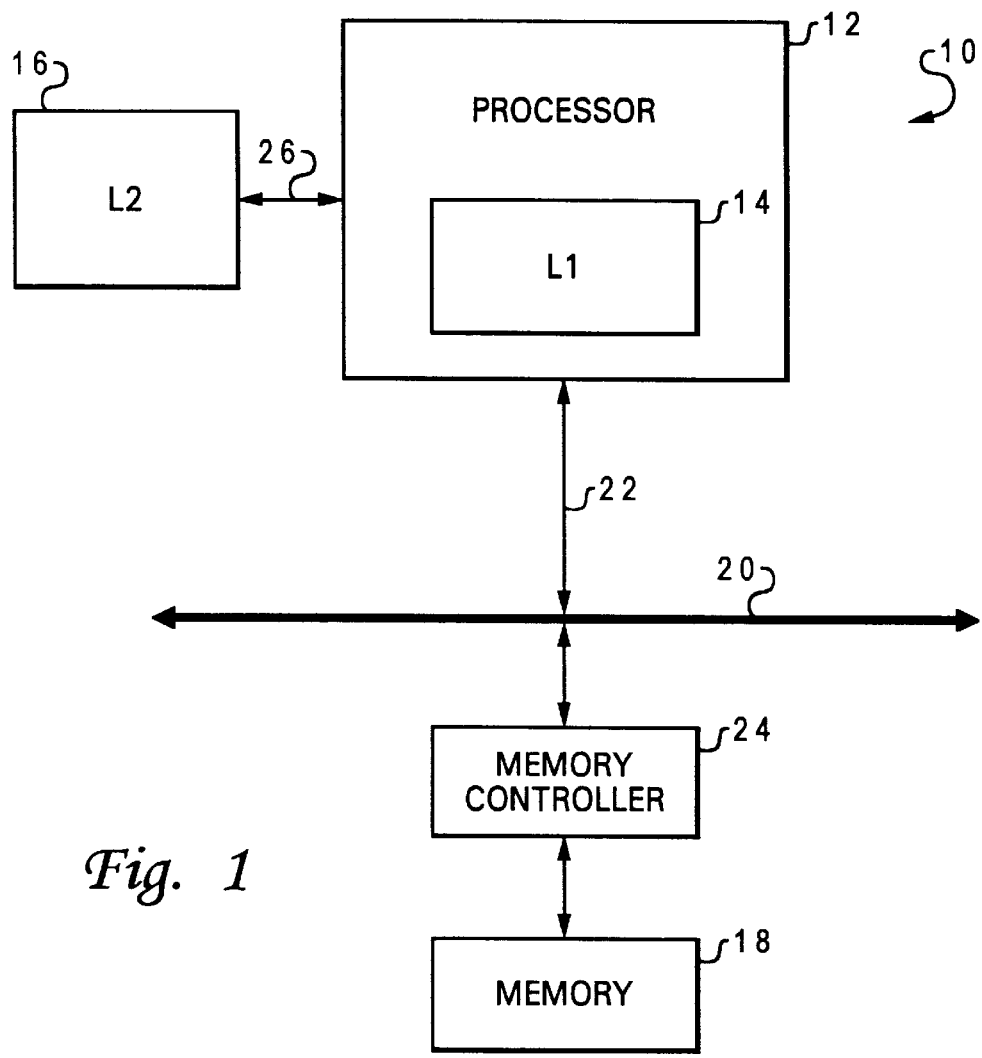
FIG. 1 is a block diagram of an illustrative embodiment of a data processing system having an L2 cache.

With reference now to the figures and in particular with reference to FIG. 1, there is depicted a block diagram of an illustrative embodiment of a processor, indicated generally at 10. The processor 10 comprises a single integrated circuit pipelined superscalar microprocessor. Accordingly, as discussed further below, processor 10 includes various execution units, registers, buffers, memories, and other functional units, which are all formed from integrated circuitry. Processor 10 preferably comprises one of the PowerPC™ line of microprocessors available from IBM Microelectronics (e.g., the PowerPC™ 603), which operate according to reduced instruction set computing (RISC) techniques. Details concerning the architecture and operation of the PowerPC™ 603 processor may be found in the PowerPC™ 603 RISC Microprocessor User's Manual, which is incorporated herein by reference. Those skilled in the art should appreciate from the following description, however, that the present invention could alternatively be incorporated.

With reference to FIG. 1, there is depicted a pictorial representation of a data processing system, which includes an illustrative embodiment of the L2 cache to which the appended claims are directed. As illustrated, data processing system 10 includes processor 12, on-board high level one (L1) cache 14, low level two (L2) cache 16, memory 18, system bus 20, processor bus 22, and memory controller 24. Processor 12 executes software instructions, which are stored in memory 18 or are received by processor 12 from another device coupled to system bus 20. In order to avoid the latency incurred by repeated accesses to memory 18, instructions and data retrieved from memory 18 are stored within L1 cache 14 or L2 cache 16 due to the probability that the instructions and data will be requested again.

L1 cache 14 comprises a small high-speed memory, which permits the registers and execution units within processor 12 rapid access to data and instructions recently retrieved from memory 18 via high-speed processor bus 22 and system bus 20. The L1 cache 14 is preferably configured as a write-back cache in order to maximize the performance of data processing system 10 by reducing the bandwidth of system bus 20 utilized to write back data to memory 18. The processor 12 is also coupled to a L2 cache 16. Like L1 cache 14, L2 cache 16 comprises a high-speed memory that contains a subset of the data and instructions stored within memory 18. In order to maximize data access efficiency, L2 cache 16 is preferably larger in size than L1 cache 14 and is also configured as a write-back cache. Although illustrated as coupled to processor 12 via a dedicated bus 26, those skilled in the art will appreciate that L2 cache 16 can alternatively be implemented on-board processor 12, coupled to processor bus 22 in an in-line or look-aside configuration, or coupled to system bus 20.

In the depicted illustrative embodiment, memory 18 comprises a random access memory (RAM) having an associated memory controller 24. Memory controller 24 generates read enable and write enable signals to facilitate storage and retrieval of data and includes address translation facilities that map logical addresses utilized by processor 12 into physical addresses within memory 18. As will be appreciated by those skilled in the art, memory 18 can comprise a number of individual volatile memory modules which store data and segments of operating system and application software while power is supplied to data processing system 10. Those skilled in the art will further appreciate that in addition to memory 18, numerous types of devices can be coupled to system bus 20 for interaction with processor 12, L1 cache 14, L2 cache 16, and memory 18; however, devices not necessary for an understanding of the illustrative embodiment described herein have been omitted for the sake of simplicity.

Figure 2:
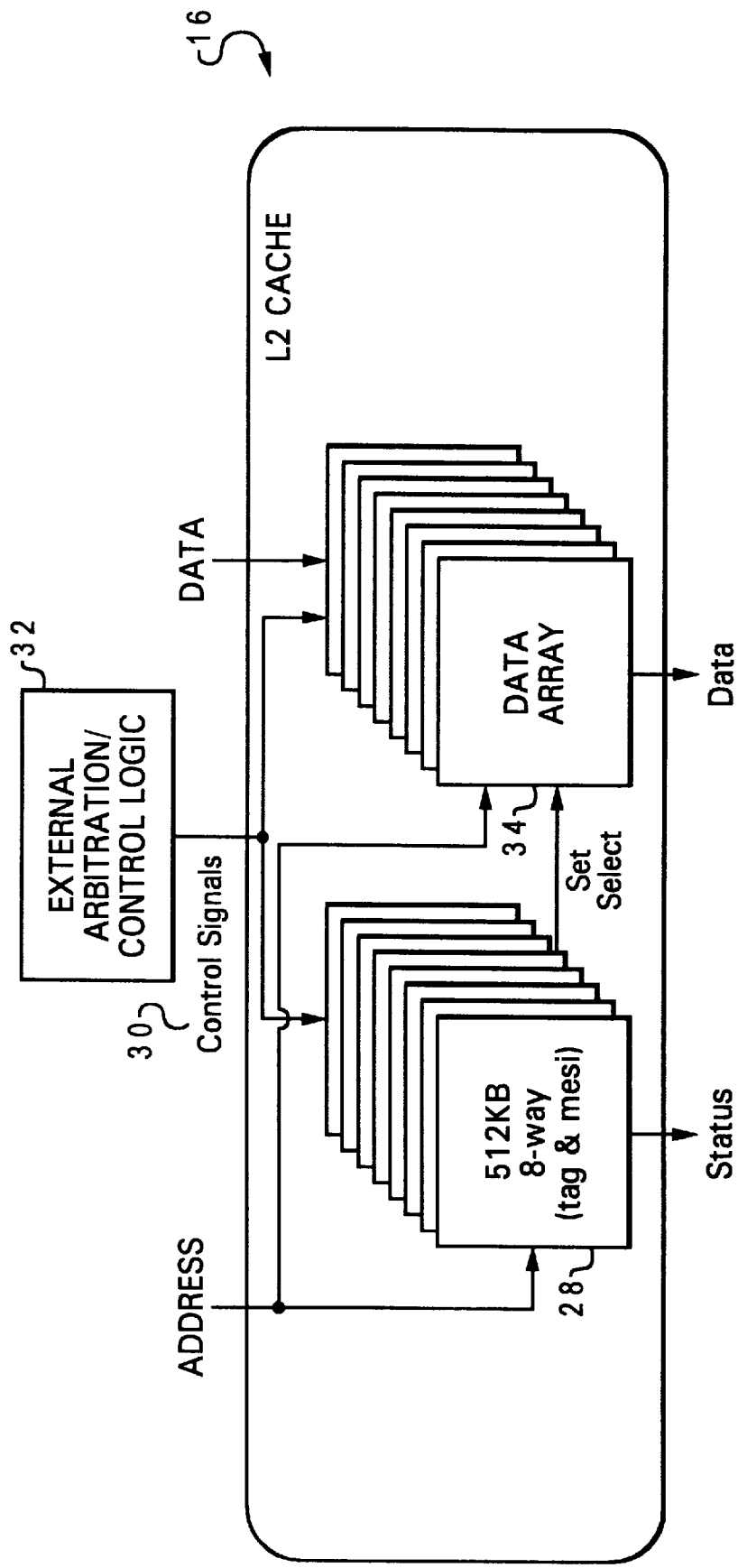
FIG. 2 is a block diagram of a low level 2 ("L2") cache memory in accordance with the present invention.

Referring now to FIG. 2, there is depicted a block diagram of an illustrative embodiment of a L2 cache 16 in accordance with the present invention. In one embodiment, the L2 cache 16 has a minimum cache block size 28 of 64-bytes, and is a 512KB 8-way set associate cache with a sectored 128-byte block. However, it should be appreciated that the method in accordance with the present invention applies to any cache size with any block size in which the coherency granule is greater than the target of a cache control instruction. The coherency granule is the smallest quantity of data shared by processors for which they can gain ownership of in a multi-processor system.

Figure 3:
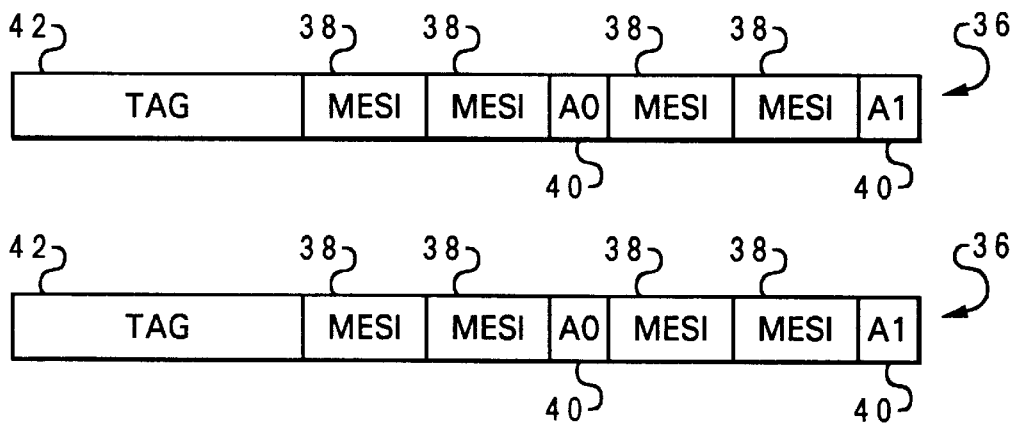
FIG. 3 is a graphic illustration of an addressing scheme utilized within the method of the present invention.

Turning once again to FIG. 2, the cache 16 having a data array and control signals 30 coming from an external control block 32, although it should be understood that the controls can be internal and integrated within the L2 cache. Referring now to FIG. 3, in the preferred embodiment the cache block is shown as a sectored 128-byte block 36 and is a requirement for 32-byte cache instructions when using a 64-byte coherency granule. As shown, by having separate state bits 38 (MESI) per each 32-byte sector, cache control instructions are able to operate on 32-byte quantities in the cache 16. Those skilled in the art will appreciate that the so-called "MESI" status bits 38 are commonly utilized within data caches. The term "MESI" is an acronym which stands for "Modified," "Exclusive," "Shared," and "Invalid." Thus, the status of data within a particular line within a data cache may be rapidly and efficiently determined by determining the status of these bits. Similarly, the status of data within a cache may be altered by writing different bits into the MESI field.

It should be appreciated that the ability to update the MESI bits 38 for any combination of sectors is a desirable feature since it provides greater flexibility in the use of the L2 bandwidth. If only one sector was allowed to be written at a time, it would take several cycles to write each one individually while keeping out other lower priority requests. The same is true for the data since bytes are received from the bus 20 for every burst read while only 32-bytes might be received from the upper level cache L1 14. By way of example, but not of limitation, four sector write enables 38 and two data write enables 40 are provided to be able to write 32 bytes or 64 bytes within the 64-byte coherency granule. The L2 control logic 32 will activate the appropriate write enable signals for the operation in progress.

Referring once again to FIGS. 2 and 3, the coherency granule is divided into a target sector 42, which is the target 32 bytes, and an alternate sector 44, which is the other 32 bytes within the 64-byte coherency granule 36. Typically in prior art processors, when a store finds a line shared in the cache, it puts a request out on the bus to claim ownership of the line. When the claim operation clears the bus, it marks the line exclusive, or modified, and stores it into the line. In accordance with the present invention, when a store command misses in the upper level L1 14, but finds the target sector 42 shared and the alternate sector 44 exclusive, or modified in the L2 cache 16, the store is considered a hit and reloads the L1 without going out on the bus. That is, the state of the alternate sector 44 must be taken into consideration to decide whether the processor has ownership of the line, or not. In a multiprocessor system the coherency granule 36 size indicates how much data is owned, whether half, or all of it is marked owned, it owns the entire size of the coherency granule 36. Therefore, the cache 16 accesses a hit in the cache in which the target sector 42 is shared and the alternate sector 44 is exclusive or modified. Also, the cache 16 accesses a hit if the target sector 42 is valid and either of the sectors is exclusive or modified.

In another preferred embodiment, when a load, or store, misses in the upper level L1 cache 14 and finds the target sector invalid in the L2 cache 16 and alternate sector 44 modified the cache access results in a miss. The cache can end up in this state by a sequence of stores to the target 42 and alternate sector 44 followed by a DCBF command to the target sector. A DCBF command causes the target 32 bytes of the coherency granule 36 to be pushed out to memory and leave the sector 42 invalid in the cache. The preferred scheme is to allow the alternate sector 44 to remain modified in the cache 16 and to put out the read burst out on the bus 20 right away. The line would be locked out from replacement until the data came back from memory 18 wherein the reload would have to be prevented. This is accomplished by setting an allocate bit 40 in the coherency granule 36 and clearing it without asserting any of the write enables that would normally be asserted during an L2 reload. The target data is forwarded to the upper level L1 cache 14 and when the whole transaction is completed, the L2 line still has the target sector 42 invalid and the alternate sector 44 modified.

Additionally, when a DCBZ command misses in the upper level L1 cache 14 and finds the target sector 42 invalid in the L2 cache 16 and the alternate sector 44 exclusive or modified, the DCBZ command causes an entire cache block, 32 bytes in this case, to be zeroed out when executed. In order for this operation to be performed, the processor must have ownership of the target coherency granule. Either sector, 42 or 44, being exclusive, or modified, implies ownership of the coherency granule 36. Therefore, since the data prior to the execution of the DCBZ command instruction is not needed and the processor has ownership of the line, the DCBZ command should be allowed to execute. This is accomplished by telling the L2 cache 16 to hit if either sector, 42 or 44 in the coherency granule 36 is exclusive or modified.

Following is a list of control signals to cover all the aforementioned operations and a brief description that are performed to the L2 cache:

hit_target_valid hit in the cache if the target sector in the coherency granule is valid.

hit_either_valid hit if either sector in the coherency granule is valid.

hit_if_x_or_m qualifier for hit_target_valid and hit_either_valid which further qualifies the hit based on either sector being exclusive or modified.

sector_we(0:3) individual sector MESI write enables, one per sector in the 128-byte block. This allows for a or all of the sectors to be written in the same cycle.

data_we(0:1) separate write enable signals for the sectors within a coherency granule. The write enable combined with the set_selects from the tag array permits 32-byte as well as 64-byte writes in the data array.

allocate_we(0:1) permits a line to be locked from being a replacement candidate while there's an outstanding miss for this line.

The table below additionally illustrates the use of the afore-described control signals to control the L2 updates and outputs.

| Operation(s) | Control Signal(s) | Comments |
| --- | --- | --- |
| Loads, ifetches, write-through stores, prefetches | hit_target_valid | The activation of these signals will tell the cache to hit if the target sector is valid. If a hit occurs, the cache will signal hit and the corresponding data will be read from the L2 data array. |
| Write-back stores (WI=b'00', or stores which allocate on a miss) | hit_target_valid hit_if_x_or_m | The activation of these signals will tell the cache to hit if the target sector is valid and either sector in the coherency granule is exclusive or modified. If a hit occurs, the cache will signal hit and the corresponding data will be read from the L2 data array. |
| DCBZ | hit_either_valid hit_if_x_or_m | The activation of these signals will tell the cache to hit if either sector in the coherency granule is exclusive or modified. If a hit occurs, the cache will signal hit. |
| L2 cast out, DCBF, and DCBST | hit_target_valid sector_we(0:3) | The activation of these signals will tell the cache to hit if the target sector in the coherency granule is valid. If a hit occurs, the data is read from the L2 data array and the sector MESI is written to Invalid. Only one of the four sector write enables will be asserted in this case. |
| L0 cast out, or push | hit_either_valid sector_we(0:3) data_we(0:1) | The activation of these signals will tell the cache to hit if either sector in the coherency granule is valid. If a hit occurs, the data is written in the L2 data array and the sector MESI is written to Modified. Only one of the four sector write enables and one of the data write enables will be asserted in this case. |
| Allocate | sector_we(0:3) allocate_we(0:1) | The allocate bit pointed to by the replacement algorithm will be turned on and all the sectors are invalidated. |
| L2 reload | sector_we(0:3) allocate_we(0:1) data_we(0:1) | The MESI bits for the two sectors in the coherency granule are updated and the 64 bytes of data is written in the L2 data array. Two of the sector write enables and both data write enables are asserted. |
| Status update | sector_we(0:3) | This operation is performed after a line is claimed on the bus and allows both sector status to be changed to exclusive. |

The control scheme described herein provides the requirement for 32-byte cache control instructions with a 64-byte coherency granule in addition to all of the other operations described in the table above. It should be noted that the flexibility built into this scheme permits new operations to be added in the future by just mapping them into some subset of these control signals. It also allows the cache design to be ported to other microprocessor designs without any changes to the cache block. Although the invention is described for a cache structure with differing cache control instruction target blocks and coherency granule size, it is still very effective even when the target size is the same; for example, 64-byte cache control instructions with a 64-byte coherency granule.

While the invention has been particularly shown and described with reference to a preferred embodiment, it will be understood by those skilled in the art that various changes in form and detail may be made therein without departing from the spirit and scope of the invention.

What is claimed is:

1. A method for operating a cache within a computer system including a processor, an L1 cache, and an L2 cache, wherein said L1 cache is at a higher level than said L2 cache, wherein said L2 cache has a predetermined coherency granule size within a data array, wherein said coherency granule has a plurality of MESI bits, and wherein said method comprises the steps of:

determining whether or not a miss has occurred in said L1 cache;

in response to determining that a cache miss has occurred in said L1 cache, determining a state of a target sector and a state of an alternate sector within said coherency granule in said L2 cache; and performing a cache control instruction in conformity with said state of said target sector and said alternate sector within said coherency granule, such that said cache control instruction selectively performs a different operation on said alternate sector than is performed for said target sector.

2. The method according to claim 1, wherein said step of performing a cache control instruction signals said L2 cache to hit if said state of said target sector is valid, and reads data from said data array if said state of said target sector is valid.

3. The method according to claim 1, wherein said step of performing a cache control instruction signals said L2 cache to hit if said state of said target sector is valid and either said target sector or said alternate sector is exclusive or modified, and reads data from said data array if said state of said target sector is valid.

4. The method according to claim 1, wherein said step of performing a cache control instruction signals an L2 cache hit if either of said target sector or said alternate sector is exclusive or modified.

5. The method according to claim 1, wherein said step of performing a cache control instruction signals an L2 cache hit if said state of said target sector is valid, reads data from said data array and writes said MESI bits as invalid.

6. The method according to claim 1, wherein said step of performing a cache control instruction signals an L2 cache hit if either said state of said target sector or said alternate sector are valid, reads data from said data array and writes said MES/ bits as modified.

7. The method according to claim 1, wherein said step of performing a cache control instruction turns on an allocate bit pointed to by a replacement algorithm and invalidates said target sector and said alternate sector.

8. The method according to claim 1, wherein said step of performing a cache control instruction updates a plurality of MES/ bits within said target sector and said alternate sector, and reads corresponding data from said data array.

9. The method according to claim 1, wherein said step of performing a cache control instruction marks said target sector and said alternate sector as exclusive after a line is claimed on a bus.

10. A method for performing 32-byte cache control instructions within a computer system including a processor having L1 cache connected by a bus to a L2 cache, said L2 cache having a 64-byte coherency granule size within a data array, said 64-byte coherency granule having MESI bits, said MESI bits defining four sector write enables and two data write enables, wherein said computer system further includes means for transferring and determining data between said processor, said L1 and said L2 cache, said method comprising the steps of:

determining whether or not a miss has occurred in said L1 cache;

responsive to determining that a miss has occurred in said L1 cache, determining a state of a 32-byte target sector and a state of a 32-byte alternate sector within said 64-byte coherency granule in said L2 cache; and performing an L2 cache control instruction in conformity with said state of said 32-byte target sector and said 32-byte alternate sector within said 64-byte coherency granule, such that said L2 cache control instruction selectively performs a different operation on said alternate sector than is performed for said 32-byte target sector.

11. The method according to claim 10, wherein said step of performing an L2 cache control instruction signals said L2 cache to hit if said state of said 32-byte target sector is valid, and reads data from said data array if said state of said 32-byte target sector is valid.

12. The method according to claim 10, wherein said step of performing an L2 cache control instruction signals said L2 cache to hit if said state of said 32-byte target sector is valid and either said 32-byte target sector or said alternate sector is exclusive or modified, and reads data from said data array if said state of said 32-byte target sector is valid.

13. The method according to claim 10, wherein said step of performing an L2 cache control instruction signals an L2 cache hit if either of said 32-byte target sector or said alternate sector is exclusive or modified.

14. The method according to claim 10, wherein said step of performing an L2 cache control instruction signals an L2 cache hit if said state of said 32-byte target sector is valid, reads data from said data array and writes of said MESI bits as invalid.

15. The method according to claim 10, wherein said step of performing an L2 cache control instruction signals an L2 cache hit if either said state of said 32-byte target sector or said alternate sector are valid, reads data from said data array and writes of said MESI bits as modified.

16. The method according to claim 10, wherein said step of performing an L2 cache control instruction turns on an allocate bit pointed to by a replacement algorithm and invalidates said 32-byte target sector and said alternate sector.

17. The method according to claim 10, wherein said step of performing an L2 cache control instruction updates a plurality of MESI bits within said 32-byte target sector and said alternate sectors, and reads corresponding data from said data array.

18. The method according to claim 10, wherein said step of performing an L2 cache control instruction marks said 32-byte target sector and said alternate sector as exclusive after a line is claimed on a bus.

19. A method for instructions within a coherency granule in a symmetrical multiprocessing system including a processor having L1 cache connected by a bus to a L2 cache, said L2 cache having a 64-byte coherency granule size within a data array, said 64-byte coherency granule having MESI bits, said MESI bits defining four sector write enables and two data write enables, wherein said symetrical multiprocessing system further includes means for transferring and determining data between said processor, said L1 and said L2 cache, said method comprising the steps of:

determining whether or not a miss has occurred in said L1 cache;

responsive to determining that a miss has occurred in said L1 cache, determining a state of a 32-byte target sector and a state of a 32-byte alternate sector within said 64-byte coherency granule in said L2 cache; and performing an L2 cache control instruction on said 32-byte target sector and said 32-byte alternate sector within said 64-byte coherency granule, wherein said L2 cache control instruction will signal said L2 cache to hit in conformity with said state of said 32-byte target sector and said 32-byte alternate sector within said 64-byte coherency granule, such that said L2 cache control instruction selectively performs a different operation on said alternate sector than is performed for said target sector.

* * * * *

UNITED STATES PATENT AND TRADEMARK OFFICE
CERTIFICATE OF CORRECTION

PATENT NO. : 6,249,845 B1  Page 1 of 1
DATED : June 19, 2001
INVENTOR(S) : Nunez et al.

It is certified that error appears in the above-identified patent and that said Letters Patent is hereby corrected as shown below:

Column 7,
Line 61, please change the word "MES/" to -- MESI --;

Column 8,
Line 1, please change the word "MES/" to -- MESI --;
Line 62, please change the word "sectors" to -- sector";

Column 9,
Line 1, after the word "for" please add -- performing 32-byte cache control --

Signed and Sealed this

Twelfth Day of March, 2002

Attest:

JAMES E. ROGAN
*Attesting Officer*  *Director of the United States Patent and Trademark Office*